(12) United States Patent
Martin

(10) Patent No.: US 7,565,660 B2
(45) Date of Patent: Jul. 21, 2009

(54) SYSTEM AND METHOD FOR UNIVERSAL EXTENSIBILITY THAT SUPPORTS A PLURALITY OF PROGRAMMABLE LOGIC CONTROLLERS

(75) Inventor: David E. Martin, Jonesborough, TN (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 499 days.

(21) Appl. No.: 10/666,425

(22) Filed: Sep. 19, 2003

(65) Prior Publication Data

US 2004/0098141 A1 May 20, 2004

Related U.S. Application Data

(60) Provisional application No. 60/413,682, filed on Sep. 26, 2002.

(51) Int. Cl.
G06F 3/00 (2006.01)
G06F 9/44 (2006.01)
G06F 9/46 (2006.01)
G06F 13/00 (2006.01)

(52) U.S. Cl. .................... 719/310; 719/313
(58) Field of Classification Search ............. 719/310, 719/313
See application file for complete search history.

(56) References Cited

U.S. PATENT DOCUMENTS

| | | | | |
|---|---|---|---|---|
| 5,038,318 A * | 8/1991 | Roseman | | 712/30 |
| 5,283,900 A * | 2/1994 | Frankel et al. | | 718/100 |
| 5,333,298 A * | 7/1994 | Bland et al. | | 719/310 |
| 5,548,759 A * | 8/1996 | Lipe | | 707/100 |
| 5,634,114 A * | 5/1997 | Shipley | | 717/170 |
| 5,838,911 A * | 11/1998 | Rosenhauer et al. | | 709/203 |
| 5,974,470 A * | 10/1999 | Hammond | | 719/331 |
| 6,044,407 A * | 3/2000 | Jones et al. | | 709/246 |
| 6,121,924 A * | 9/2000 | Meek et al. | | 342/357.13 |
| 6,173,438 B1 * | 1/2001 | Kodosky et al. | | 717/109 |
| 6,243,857 B1 * | 6/2001 | Logan et al. | | 717/111 |
| 6,282,454 B1 * | 8/2001 | Papadopoulos et al. | | 700/83 |
| 6,334,158 B1 * | 12/2001 | Jennyc et al. | | 719/328 |
| 6,539,422 B1 * | 3/2003 | Hunt et al. | | 709/217 |
| 6,547,150 B1 * | 4/2003 | Deo et al. | | 235/492 |
| 6,564,242 B1 * | 5/2003 | Bonet et al. | | 709/201 |
| 6,618,817 B1 * | 9/2003 | Armstrong | | 714/4 |
| 6,675,226 B1 * | 1/2004 | Nair et al. | | 709/250 |
| 6,715,139 B1 * | 3/2004 | Kodosky et al. | | 717/125 |
| 6,721,607 B2 * | 4/2004 | Brault | | 700/18 |

(Continued)

Primary Examiner—Hyung S Sough
Assistant Examiner—KimbleAnn Verdi
(74) Attorney, Agent, or Firm—Jose de la Rosa

(57) ABSTRACT

A method and system is provided for creating applications for one or more types of programmable logic controllers (PLCs). A open development kit (ODK) is provided that permits dynamic link libraries to be created and interfaced to a user application software and also to the interface layers of the various types of PLCs. The types of PLCs may include soft PLCs, slot PLCs, and hard PLCs and interface via slots of a personal computer platform. The ODK provides generic interfacing to the various types of PLCs and establishes the necessary operating environment structure to implement processing in either a non-real time and a real time mode. A single application package may then control and manage the various types of PLCs. Communication paths are provided from the PLCs to the ODK subsystem to the user application so that the application software is essentially indifferent to type of PLC involved.

32 Claims, 8 Drawing Sheets

U.S. PATENT DOCUMENTS

| | | | |
|---|---|---|---|
| 6,816,865 B2 * | 11/2004 | O'Brien et al. | 707/100 |
| 7,340,717 B2 * | 3/2008 | Allen et al. | 717/106 |
| 7,373,349 B2 * | 5/2008 | O'Brien et al. | 707/100 |
| 7,478,406 B2 * | 1/2009 | Pauly et al. | 719/319 |
| 2002/0133635 A1 * | 9/2002 | Schechter et al. | 709/310 |

* cited by examiner

SYSTEM AND METHOD FOR UNIVERSAL EXTENSIBILITY THAT SUPPORTS A PLURALITY OF PROGRAMMABLE LOGIC CONTROLLERS

CROSS-REFERENCE TO RELATED APPLICATIONS

This application claims the benefit of U.S. Provisional Patent Application No. 60/413,682, filed on Sep. 26, 2002, incorporated by reference herein, in its entirety.

BACKGROUND OF THE INVENTION

1. Field of the Invention

The invention generally relates to a software development platform, and more particularly, a software development platform for providing a universal unifying interface to a plurality of programmable logic controllers.

2. Background Description

Programmable Logic Controllers (PLCs) typically include a customized piece of hardware that has an instruction set geared for the industrial control industry. This piece of hardware is often referred to as a Hard PLC. The programming language is usually ladder logic or some other language that is appropriate for the control application The programs (control programs) usually involve the manipulation of memory areas in the PLC that are tied through other specific pieces of hardware (I/O modules) to machinery such as, for example, switches, pumps, motors, machines, etc. These I/O modules are usually mounted on a rack and can be accessed over a network.

In recent years, the control industry has expanded to take advantage of the power of the Personal Computer (PC). A Soft PLC is a software version of the Hard PLC. Instead of having actual circuitry boards that execute the control program, a software program that runs on the PC executes the program. Additional cards may be inserted into the PC chassis to allow for access to the I/O modules. The Soft PLC will interface with these cards which, in turn, interface with the I/O modules.

There is another version of the PLC called a Slot PLC. This is a piece of hardware that is in the form of a card that can be inserted into a PC's chassis. The Slot PC contains substantial portions of hard PLC circuitry (or similar) and behaves substantially like a Hard PLC, but has a limited amount of accessibility and interaction to any other applications on the PC. Essentially, it is a Hard PLC on a PC card form with limited interaction with software running on the PC itself.

However, developing applications software for each of these types of PLCs can be exceedingly costly since the interfaces between PC applications and each type of PLC are different and the programming methodology within each type of PLC may be substantially different. Providing enhancements to these different types of PLCs, so that they are evolved with the same or similar features, is difficult and expensive. Design and development time, cost, and reliability issues to replicate functionality for each of these PLC types are an impediment to efficient and cost-effective life-cycle product development.

SUMMARY OF THE INVENTION

In an aspect of the invention, a method is provided for an open development kit. The method comprises the steps of sending a specific formatted load application request message from a programmable logic controller (PLC) to an open development kit (ODK) subsystem, and converting the specific formatted load application request message to a generic formatted load application request message. Further included are the steps of sending the generic formatted load application request message from the ODK subsystem to an application for requesting an extension to be loaded and requesting execution of the application.

In another aspect of the invention, a system for providing an open development kit is described. The system comprises a means for sending a specific format load application request message from a programmable logic controller (PLC) to an open development kit (ODK) subsystem, a means for converting the specific format load application request to a generic format load application request message by the ODK subsystem. Further provided are a means for sending the generic load request from the ODK subsystem to an application requesting an extension to be loaded and a means for requesting execution of the application.

In another aspect, a system for providing an open development kit is described. The system comprises a means for sending a specific format load application request message from a programmable logic controller (PLC) to an open development kit (ODK) subsystem and a means for converting the specific format load application request to a generic format load application request message by the ODK subsystem. Further included are a means for sending the generic load request from the ODK subsystem to an application requesting an extension to be loaded and a means for requesting execution of the application.

In another aspect of the invention, a kit for open development is provided. The kit comprises a means for receiving a specific formatted message from a programmable logic controller (PLC), a means for converting the specific formatted message to a generic formatted message and a means for sending the generic formatted message to an application for execution.

In another aspect of the invention, a computer program product is provided comprising a computer usable medium having readable program code embodied in the medium and includes a first computer program code to send a specific formatted load application request message from a programmable logic controller (PLC) to an open development kit (ODK) subsystem and a second computer program code to convert the specific formatted load application request message to a generic formatted load application request message. Also included are a third computer program code to send the generic formatted load application request message from the ODK subsystem to an application for requesting an extension to be loaded and a fourth computer program code to request execution of the application.

BRIEF DESCRIPTION OF THE DRAWINGS

The foregoing and other objects, aspects and advantages will be better understood from the following detailed description of embodiments of the invention with reference to the drawings, in which.

DETAILED DESCRIPTION OF EMBODIMENTS OF THE INVENTION

The invention provides an Open Development Kit (ODK) package, for use on a personal computer (PC) or similar computing platform, which is capable of establishing universal extensibility and interfaces (I/F) to a plurality of different types of PLCs. The PLCs may include Soft PLCs, Hard PLCs, and Slot PLCs. The ODK permits users to create evolutionary features or modifications to existing features and functions in a common application software package that interacts and controls PLC functions, which may be a Soft PLC, Hard PLC, or Slot PLC.

Figure 1:
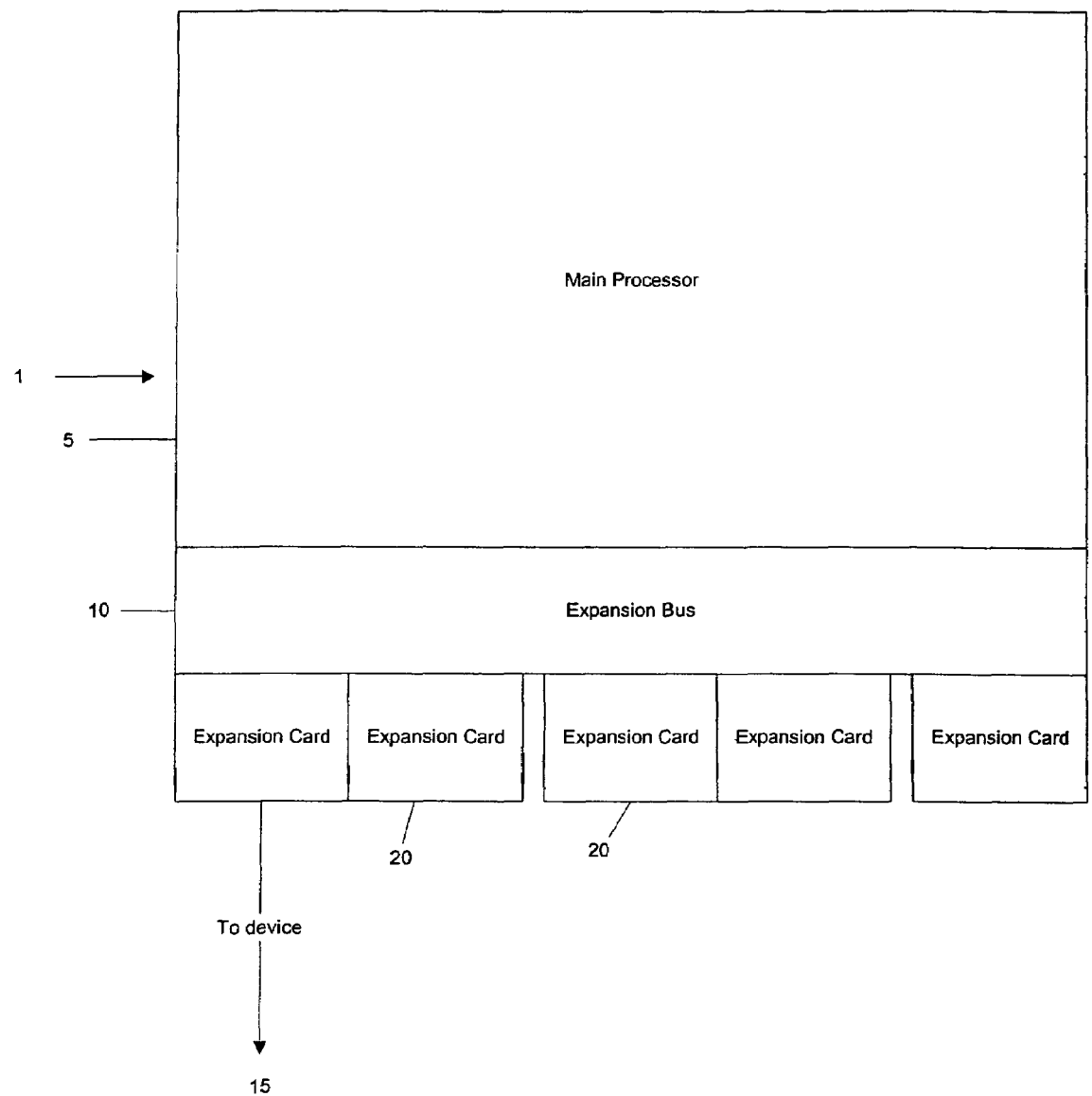
FIG. 1 is a diagram of an exemplary PC based PLC environment.

FIG. 1 is a diagram of an exemplary PC-based PLC environment, generally denoted by reference numeral 1. A PC Station 5 includes an expansion bus 10 with PC slots 20 that accept board based Slot PLCs, interfaces for Hard PLCs or interface adaptor cards for soft PLC implementations. Communications 15 for interfacing and controlling devices in a manufacturing environment, or the like, are provided by each board in the PC slots 20, as necessary. The communications 15 may include various network interfaces and topologies, e.g., Ethernet or PROFIBUS-DP (IEC 61158) in communication with controlled devices.

Figure 2:
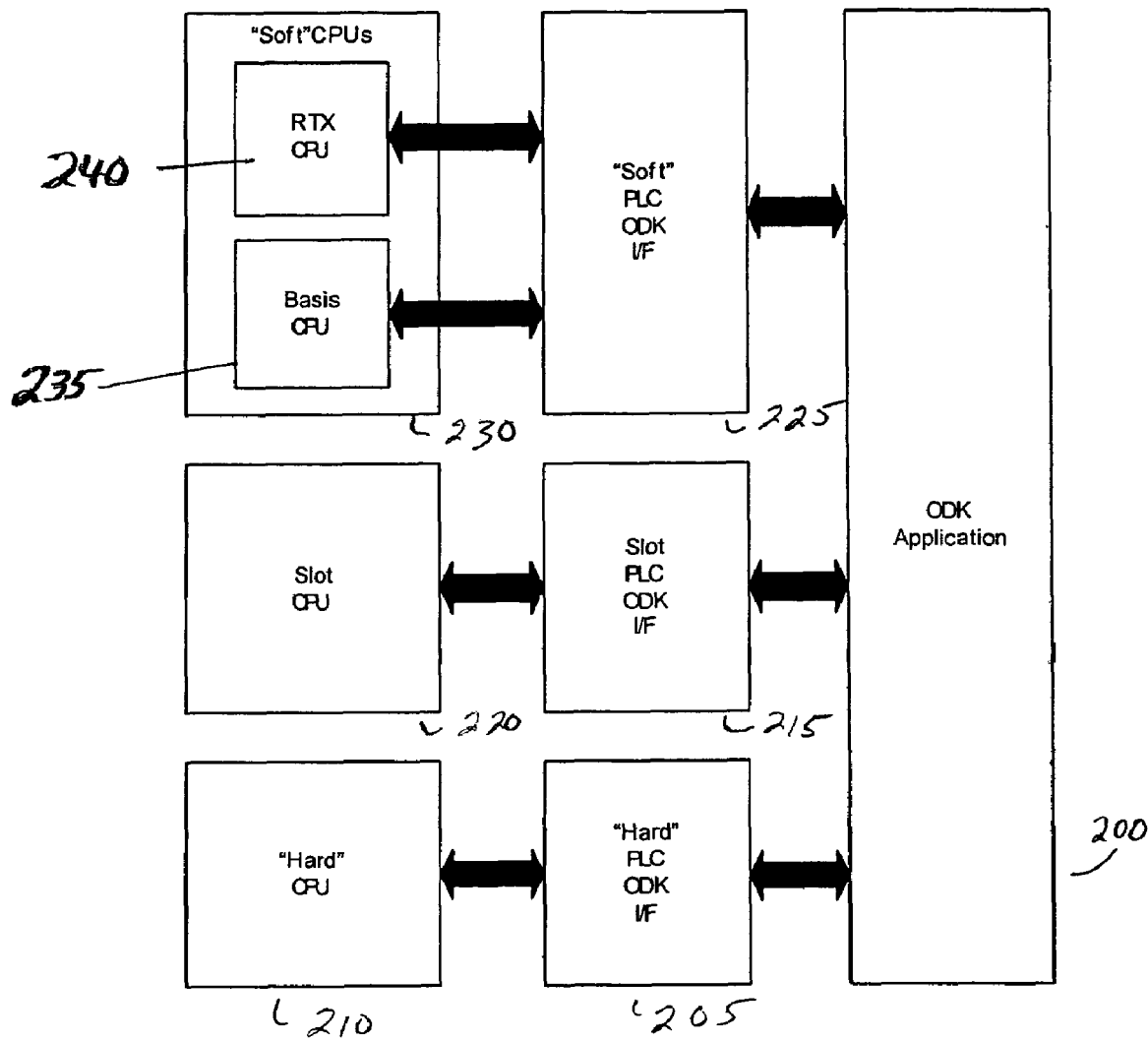
FIG. 2 is a block diagram of an embodiment of the invention.

FIG. 2 is a block diagram of an embodiment of the invention. The embodiment of FIG. 2 includes an ODK application 200 which is a software control enhancement program for controlling devices (e.g., machinery, industrial controls, etc.) in a PLC environment and may be employed using the PC-based PLC environment of FIG. 1. Also included in FIG. 2 are the various PLC types which may typically interface in a slot of a PC and comprise a Hard PLC ODK I/F 205 that provides control and interaction with a Hard PLC 210. A slot PLC ODK I/F 215 provides control and interaction with a Slot PLC 220 that resides in the PC platform bus slot. A Soft PLC I/F 225 provides control and interaction with a Soft CPU 230. The Soft CPU 230 may include a Windows based virtual CPU, WinAC Basis 235 and/or WinAC RTX based virtual CPU 240. The invention provides a single common development tool to generate ODK applications (e.g., 200) for all the WinAC product types (e.g., 210, 220, 230).

The ODK package, also known generally as WinAC ODK, provides a single engineering tool set for use with the several types of PLC products instead of having separate tool sets for each of the PLC products. The ODK uses an operating system such as, for example, Windows® (Windows® is a registered trademark of Microsoft Corporation) which provides the software environment for application software to run under and interact with the various types of PLCs and I/O devices. The ODK tool kit permits users or developers to create projects that are directed to enhancing the control program of one or more of the various types of PLCs.

The components of the tool set include the following, for example:

A generic Application Wizard.

Header files to be included in the application project to provide the ODK interface template.

Library files to be included in the application providing access to the ODK interface in the WinAC product.

Example projects demonstrating the ODK functionality.

The Application Wizard includes a common tool for generating applications for the various types of WinAC compliant PLC products. Two modes are provided. First, a Real Time Dynamic Link Library (RTDLL) project may be generated for those users desiring to take advantage of a Real Time environment provided with a WinAC RTX product. Second, a Dynamic Link Library (DLL) project may be generated for non-Real-Time based applications.

The generated projects provide access to the standard ODK interface of the various types of PLC products. Code stubs are provided in the project for the CPU to ODK application calls. The header files and libraries included in the projects provide access to the ODK application to CPU calls. The generated project also contains helper classes for accessing Step 7 type data from the buffer that is passed between the CPU and the ODK application. Step 7 is another program which is used to write the control program for the PLC and has specific formats for data and programming constructs that are known to one of ordinarily skill in the art. Step 7 is a programming tool for PLCs.

The Hard PLC 210 is typically considered a more traditional type of PLC, as discussed previously. Soft PLCs may comprise different embodiments and may include, for example, WinAC Basis (Basis CPU 235) and WinAC RTX (RTX CPU 240). The WinAC Basis is a Soft PLC that is used when Real-Time functionality is not required or necessary for the control process of industrial devices, or the like. For those applications that require (or more reliable scanning is desired) Real-Time processing, WinAC RTX may be used. The Slot PLC (Slot CPU 220) is typically a hybrid of the Hard PLC and the Soft PLC as previously described.

In addition to automatically generating the above functionality, the Application Wizard walks an application developer through the generation of code stubs for the following tasks, for example:

Subcommands which allow the CPU to execute specific actions in the application. These subcommands are a case statement in the extension code. Each subcommand has a unique value associated with it. When the subcommand is passed in to the extension application using the Execute command from the PLC control program, the subcommand passes through the case statement so that the appropriate task is accomplished in the extension application.

Asynchronous processes which allow the execution of actions outside of the main line of execution. Each of these processes is created on a unique thread. This enables tasks to be accomplished outside of the main execution thread (using the Execute command) from the PLC control program. These processes may interface with third party devices, perform some lengthy calculation, or perform some other time intensive task that would adversely affect the scan cycle. At creation time, the thread priority can be set as higher or lower than the main execution thread priority.

Asynchronous monitoring which allows the application to monitor actions outside of the main line of execution. These tasks are similar to the asynchronous processing mentioned above. However, they differ because these are monitoring tasks and they will monitor for events that occur. When the specified event occurs, the asynchronous monitor task will perform some task in the extension application.

The features of the WinAC ODK toolkit product remove the need for ODK products to be created for each WinAC CPU product (e.g. WinAC RTX ODK, WinAC Basis ODK, or Slot PLC). The developer now has a single common tool to generate ODK applications for all of the WinAC CPU product types. The ODK also provides the ability to generate an ODK project which, in turn, will generate a DLL which can be used with any of the WinAC ODK capable products. The generated DLLs provide the linkages between the application software generated by the developer and the interfaces to each of the various PLC types as shown in FIG. 2. These functions are described in more detail with reference to FIGS. 5A-6. The application need only be developed once and may then be targeted to more than one type of PLC, instead of developing the same application for each type of PLC. The DLLs produced by the ODK provide the transformational interfacing as needed to each PLC type.

The ODK system is installable without changing the CPU Proxy application and maintains backward compatibility with previous versions, e.g., it allows interaction with common object module (COM) objects where required by the application. The interface is provided as a direct in-process interface for best performance and to avoid the overhead of marshalling, copying, and issues of memory allocation.

There are behavior differences between DLLs in NT and DLLs in RTSS. The design minimizes dependencies on DLL differences. DllMain is minimized or eliminated in the ODK. Callback dependencies (dependencies in the DLL on functions or class interface in the module loading the DLL) are also minimized.

Figure 3:
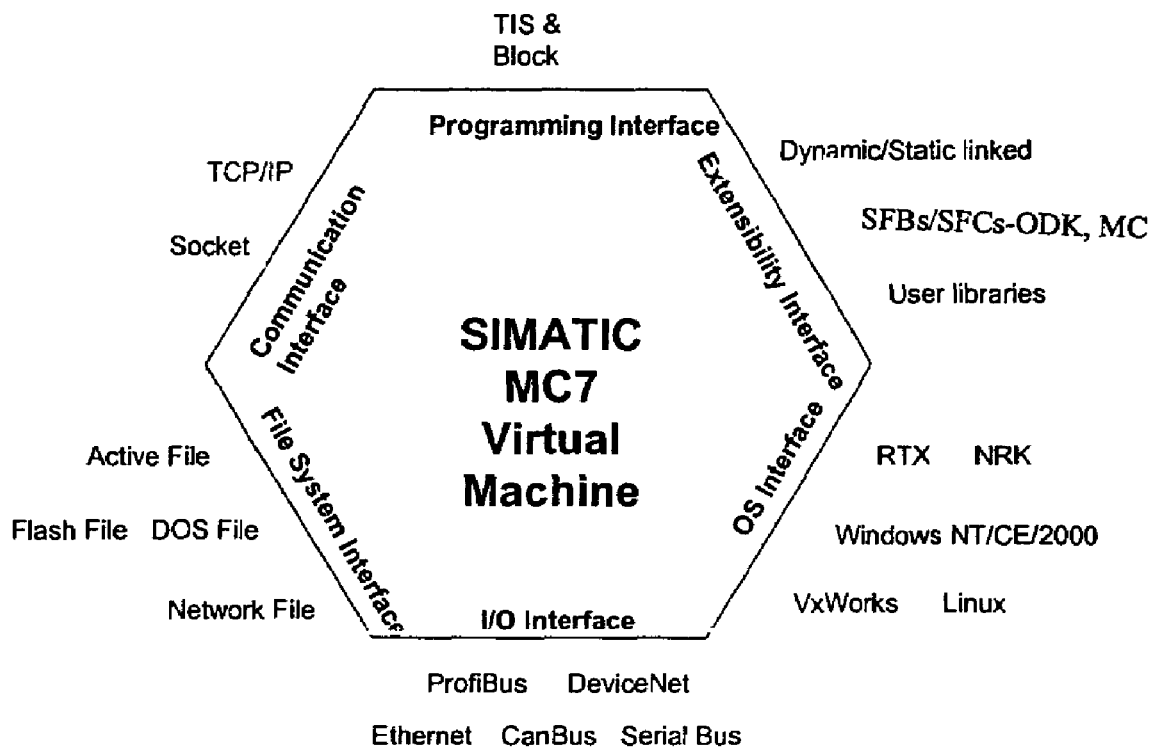
FIG. 3 is an illustrative diagram showing the elements of a virtual CPU and services in the PC-based PLC environment including general categories, according to the invention.

FIG. 3 is an illustrative diagram showing the elements of a virtual CPU and services in the PC-base PLC environment 1 including general categories as operating system interfaces, I/O interfaces, file system interfaces, communication interfaces, programming interfaces, and extensibility interfaces. These interfaces allow the basic "CPU" of the virtual machine to be expanded and enhanced by adding other software pieces. The virtual machine (e.g., SIMATIC MC7 Virtual Machine) is written in portable code that can be moved to different types of hardware and typically executes without modifications. The interfaces described above may be changed as necessary by those of ordinary skill, the virtual machine is moved to different hardware platforms to allow it to interface with its altered environmental surroundings. The extensibility interface provides the extensibility of the operating environment to permit the generic operation of a PLC application to interface with the different types of PLCs as shown in FIG. 2. The extensibility interface permits user libraries, system blocks (SFBs/SFCs), and DLL to be dynamically and statically linked as necessary to translate commands and events from a user application (which may be a uniquely created application) to the PLC interfaces appropriate to the type of PLC. This provides for replaceable functionality as necessary for PLCs.

Figure 4:
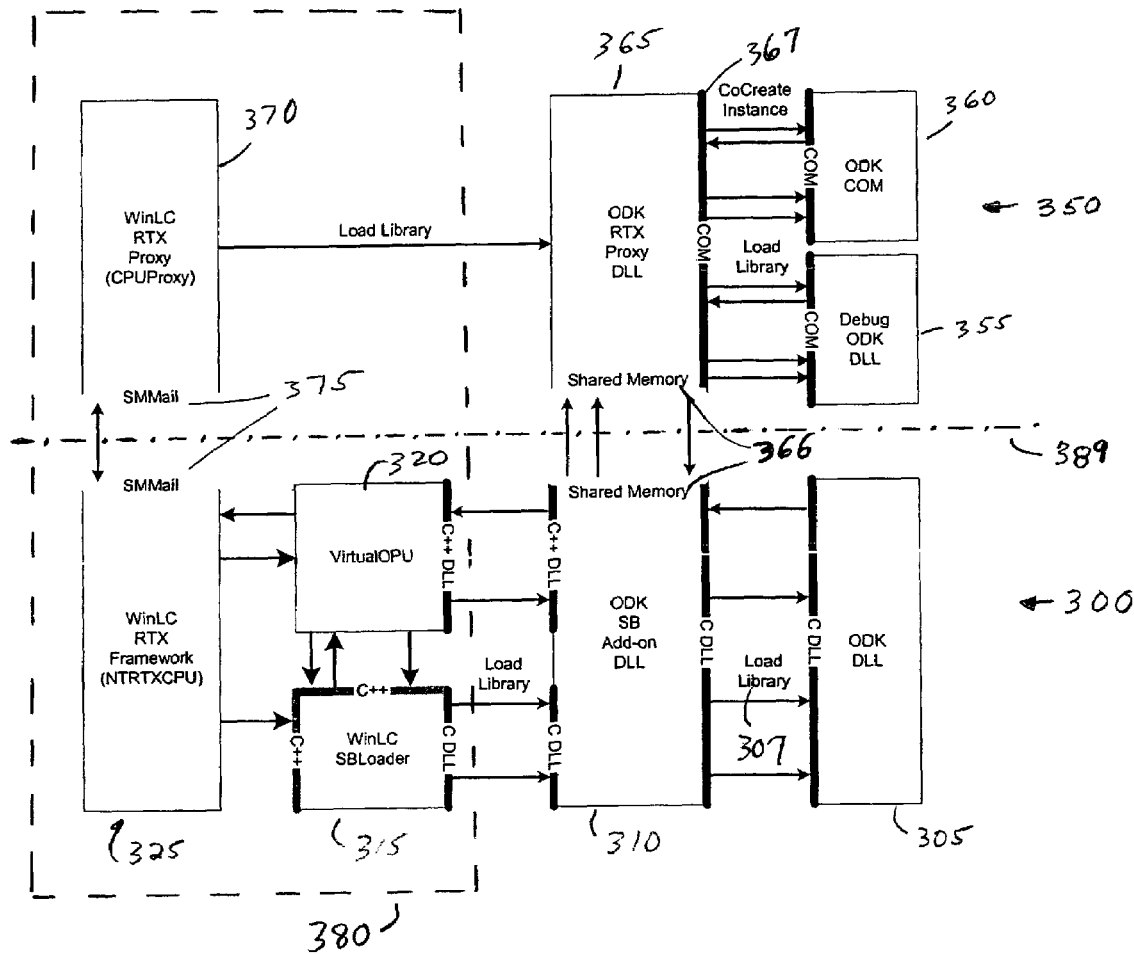
FIG. 4 is a block diagram of an embodiment showing components involved to implement the RTX (real-time) version of an open development kit (ODK), according to the invention.

FIG. 4 shows the components involved to implement the RTX (real-time) version of ODK. FIG. 4 shows two portions, a RTX portion which is essentially a real-time environment (deterministic environment with fixed scan cycles), generally denoted by reference numeral 300 (below the partition line 389) and a Windows portion, generally denoted as reference numeral 350 (above the partition line 389) which is an essentially non-real time (non-deterministic with non-fixed scan cycles) operating environment for certain PLC applications. The RTX portion 300 includes an ODK DLL 305, an ODK System Block (SB) Add-on DLL 310 for implementing a generic interface to the WinLC SBLoader 315. The generic interface allows for the WinLC SBLoader 315 to load any software component for any type of PLC. The WinLC SBLoader 315 loads system blocks.

FIG. 4 also shows a Virtual CPU 320 (e.g., V7) for execution of the loaded PLC control program in a real-time mode, and a WinLC RTX framework 325 which includes providing the operating environment for RTX services in the real-time side and includes coordinating process interaction with the non-real time operating environment, e.g., 350. The coordination of the two operating system environments may be performed via bidirectional messaging interface 375 (e.g., SMMail).

The Windows portion 350 (i.e., non-deterministic non-real time operating environment with non-fixed scan cycles) includes user ODK COM objects 360 and ODK Debug DLL's 355, ODK RTX Proxy DLL 365 that is responsible for communicating through shared memory 366 to the ODK SB Add-on DLL 310 and for implementing the ODK COM interface 367, and WinLC RTX Proxy 370 that provides a view within Windows to the real-time side. The COM object is an extension application using Microsoft's COM technology. The COM object functions the same as the DLL extension application in a real-time system 305. The WinLC RTX Proxy 370 communicates and coordinates with the RTX side 300 via the messaging interface 375.

A Soft PLC instance includes the area in the box 380. For each instance of a soft PLC application running in the PC-based PLC environment 1, the components of 380 may be instantiated.

Control programs often use system blocks. These are blocks that are provided by the programming tool (in this case Step 7) that perform predefined tasks. System blocks include SFBs (System Function Blocks), SFCs (System Functions), and SDBs (System Data Blocks). SFBs and SFCs provide pre-written code with a defined interface to the code similar to API calls in the Windows programming environment. SDBs hold system data that may be accessed. The ODK subsystem interface is implemented by providing two SFBs that may be called from one or more of the PLC control program. One SFB is the Create call. This SFB may accomplish steps 400 through 435 of FIGS. 5A-5C, and is called only once from the control program. The second SFB is the Execute call and it is responsible for items 445 through 460, of FIGS. 5A-5C. This second SFB can be called multiple times in the control program. The loading of system blocks may be implemented by one of ordinary skill in the art.

Responsibility for block generation is in the WinLC SBloader 315. This class is able to load any "system blocks" including SFBs, SFCs, SDBs (i.e. SDB1), or DBs. Product specific code for block generation is removed from the CPU personality, the block manager. A product specific WinLC SBLoader 315 is part of the application framework and typically is not part of the Virtual CPU 320. Some standard library functions are included in the Virtual CPU 320 to create and load classes of System Function Blocks. For example, three functions may be LoadCommonSysBlocks, LoadPMCSysBlocks, LoadPrintSysBlocks. WinLC SBLoader 315 also obtains the names of DLLs to load. These DLLs are required to have a Load function, similar to the library functions, to dynamically add blocks.

The names of add-on DLLs are typically maintained in a system registry. The registry entry may be the one passed in the call to OSLoadLibrary (for accessing library such as 307) so the location of the DLL is completely under Setup control. This information is obtained from the registry using an extended PCStation interface.

The CPU invokes methods in the WinLC SBLoader 315 at the appropriate time during construction to create and link the system blocks. The CPU Proxy 370 is responsible to Load and Free the ODK RTX Proxy DLL, but, in implementations, has no other interaction with the DLLs. Using a DLL proxy instead of a separate executable simplifies the creation and coordinating of executables and executable lifetimes. For example, the proxy DLLs come into existence and go out of existence with the CPU Proxy application in this case, so the startup rules are automatically the same as the CPU Proxy 370. Also, if the CPU Proxy 370 is a service, then so is the proxy DLL.

ODK Components

The ODK components include the ODK SB Add-on DLL 310 and the ODK RTX Proxy DLL 365. The ODK RTX Proxy DLL 365 is responsible for communicating through shared memory to the ODK SB Add-on DLL 310 and implementing the ODK COM interface 360. The ODK SB Add-on DLL 310 implements the generic interface to SBLoader 315 and the two ODK specific SFBs that were defined earlier in this document.

ODKServer is a class which implements an OSShared-Memory interface, e.g., 366, to ODK SB Add-on DLL 310 and has a dispatch thread which can support COM calls. ODKServer implements the create and execute and ODK IWinLCService callback functions. A separate Create function is called to do the minimal setup required to receive a command from the ODK DLL 305.

Figure 5A:
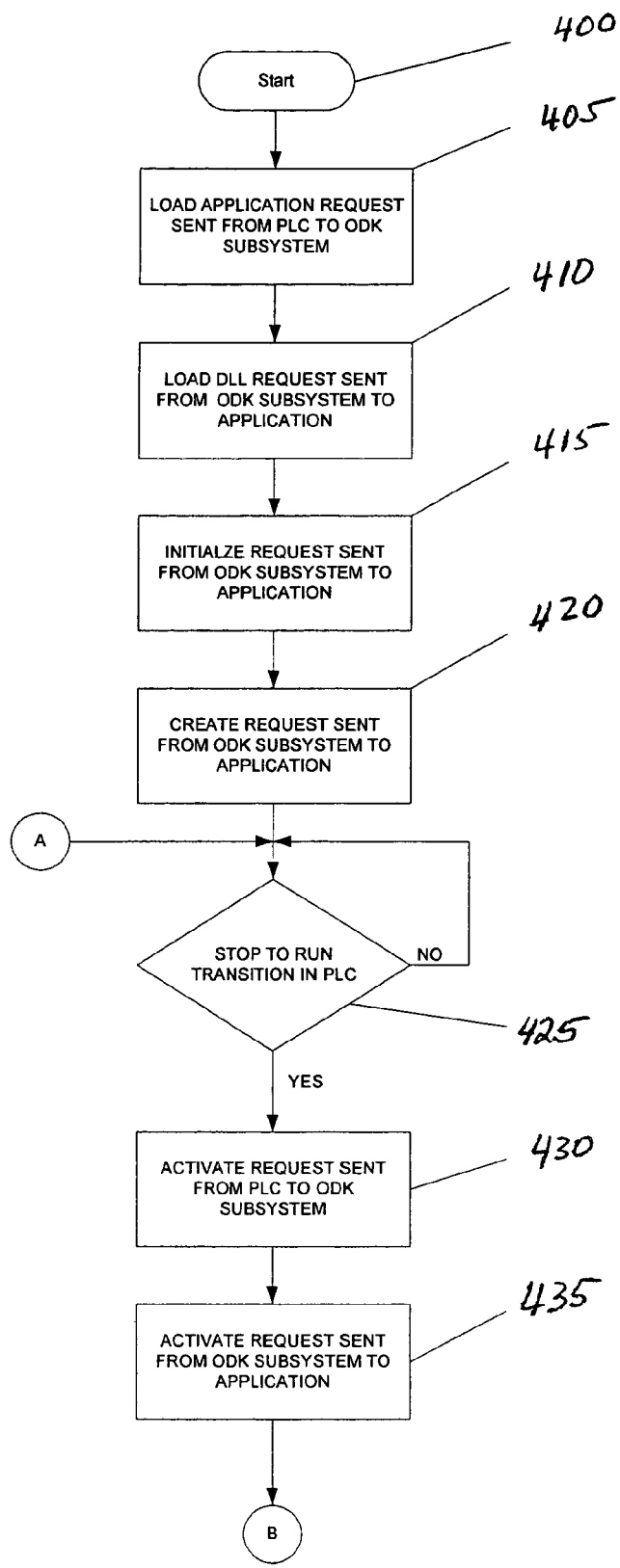
FIGS. 5A-5C is a flow diagram showing steps of an embodiment for using the invention.
Figure 5B:
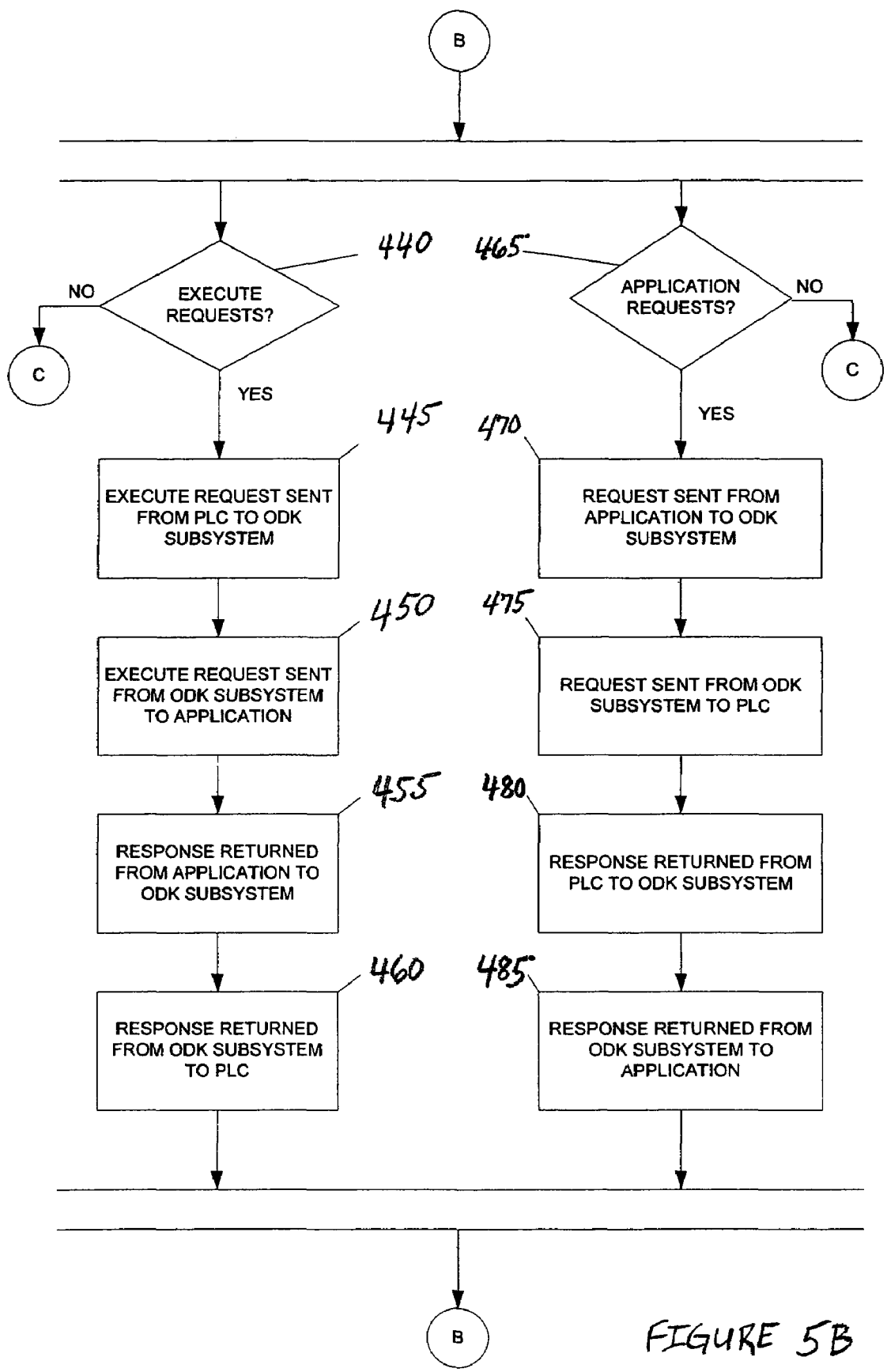
Figure 5C:
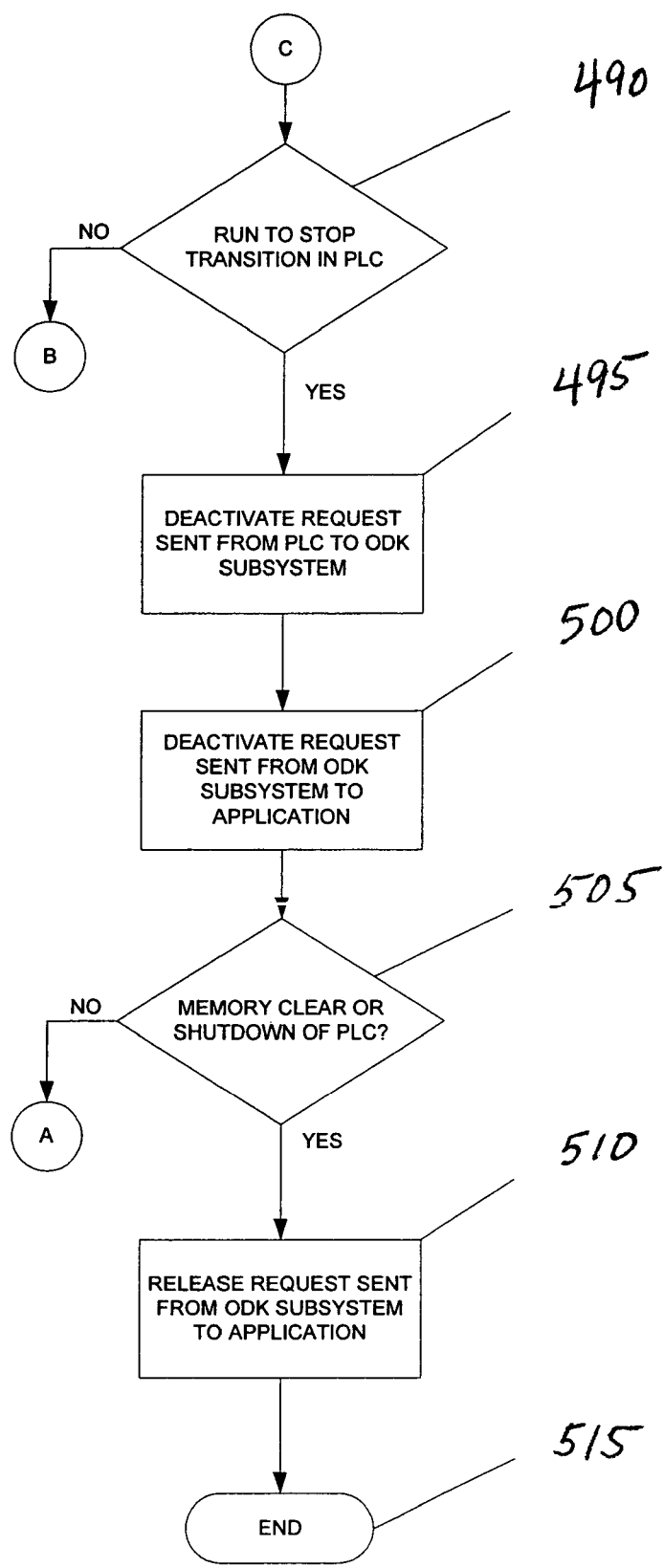

FIGS. 5A-5C are flow diagrams showing steps of an embodiment for using the invention, beginning at 400. FIGS. 5A-5C may equally represent a high-level block diagram of components of the invention implementing the steps thereof. The steps of FIGS. 5A-5C may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. FIGS. 5A-5C may be implemented, for example, using the components of FIG. 4 and the PC-based PLC environment of FIG. 1.

Figure 6:
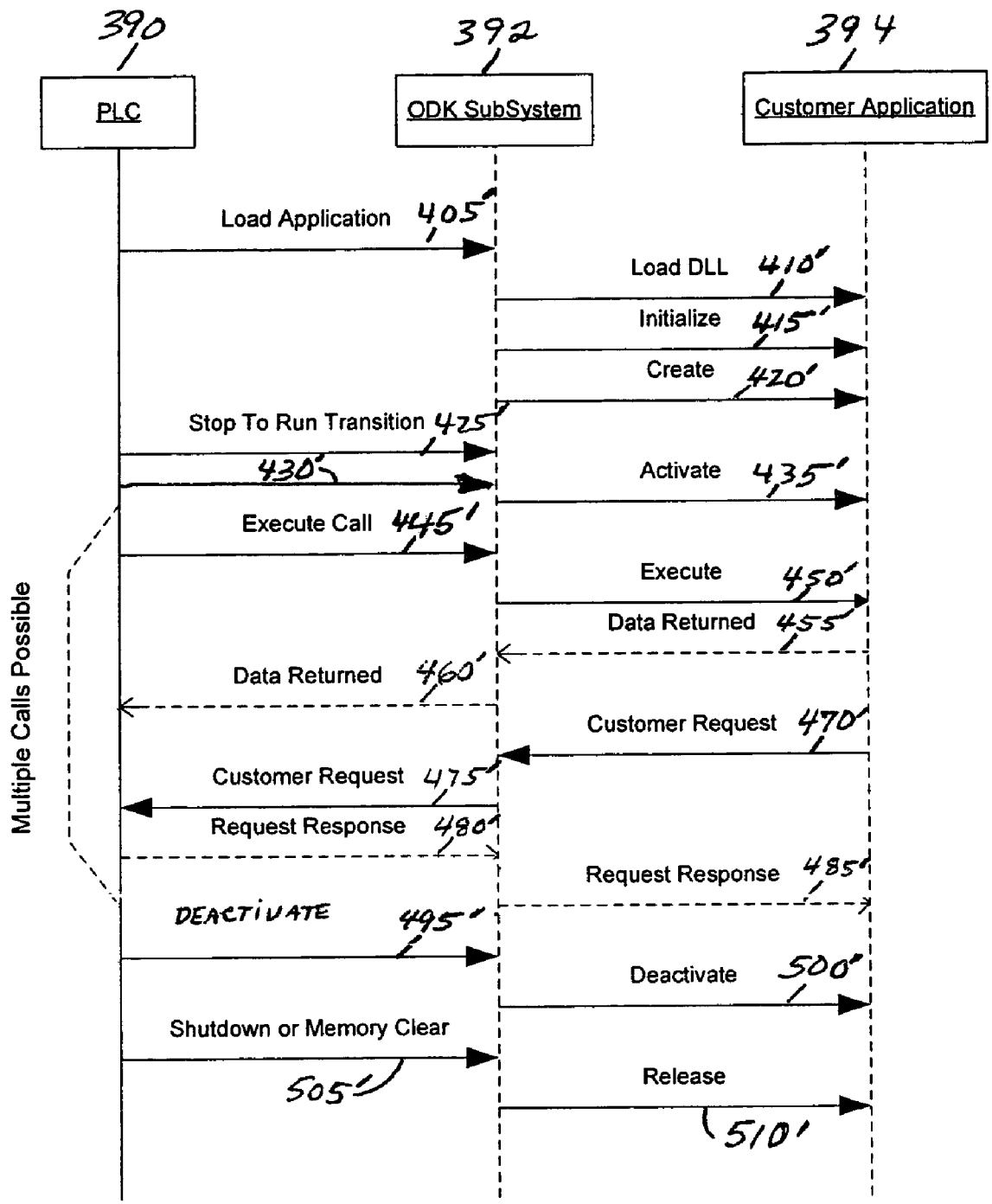
FIG. 6 is a sequential flow diagram of an embodiment showing the steps and interaction between components of the invention.

FIG. 6 is a sequential flow diagram of an embodiment showing the steps and interaction between components of the invention. The steps of FIG. 6 substantially parallel the steps of FIGS. 5A-5C and these parallel steps are reflected by corresponding reference numerals, for example, FIG. 5, step 405 parallels step FIG. 6, step 405'. The sequential flow diagram of FIG. 6 illustrates, by way of example, sequencing of the steps from perspective of PLC interface 390 (which may be one of 210, 220, or 230), a ODK subsystem 392 (which may be one of 205, 215, 225 and include the components of 310 and 365) and a customer or user application 394 (e.g., 200). The ODK subsystem 392 provides a unifying function of commands and requests from the various type of PLC that may have different command and request structures. The ODK subsystem 392 converts specific formatted PLC commands and messages as necessary to a generic format for presentation to the application 394, and conversely, reconverts commands and requests from the application 394 to PLC interfaces 390, as necessary, to specific formats for the various types of PLCs', according to their type.

Continuing simultaneously with FIGS. 5A-5C and FIG. 6, at step 405, the PLC 390 sends a request to the ODK subsystem 392 to load the application DLL(s) that is to be included in the scan cycle of the PLC 390. The DLL(s) provide the open communication into the scan cycle of the PLC 390. At step 410, the ODK subsystem 392 loads the DLL(s) or extensions from the customer application 394 by sending a request to load the extensions. At step 415, the ODK subsystem 392 calls the Initialize function in the application and initializes a list of callback function pointers for use as function calls back into the ODK subsystem 392 by the application 394.

At step 420, the ODK subsystem 392 calls a Create function in the application which performs initialization of functionality required when the DLL(s) is loaded. At step 425, a check is made whether a stop to run transition has occurred in the PLC 390. If a transition has occurred, then at step 430, the PLC 390 sends a request to the ODK subsystem 392 to activate the application 394. At step 435, the ODK subsystem 392 calls the Activate function in the application 394 which performs and executes functionality required after loading the DLL(s) and required before the DLL(s) actually begin its normal scan cycle execution.

At step 440, a check is made whether there are requests for Application execution in the PLC. If not, processing continues at step 490, otherwise execute the requests. As shown by parallel flow lines in FIG. 5B, execution (from the PLC 390) requests may be performed at the same time as application 394 requests. At step 445, the PLC 390 requests that the ODK subsystem 392 execute the application. The command to be executed along with input areas and output areas are provided, the ODK converts as necessary the command to a generic command. At step 450, the ODK subsystem 392 calls the Execute function in the application 394 and passes the generic command and input/output areas to the application 394. Control is passed to the application 394 at this time.

At step 455, the application 394 executes the requested command. The input area is read and the output area is written, as necessary. After completion of the execution of the command, the application 394 returns the response, data, and control back to the ODK subsystem 392. At step 460, the ODK subsystem 392 converts the generic response and parameters into a format suitable for the target PLC type and returns these results of the Execute request to the PLC 390.

At step 465, a check is made whether there are any requests for information for the PLC 390 in the application 394. If not, the process waits for a PLC state change to occur or requests for PLC information to occur. Otherwise, the process executes the requests, and at step 470, the application 394 requests information from the PLC 390 using the callback function pointers established at step 415. The application 394 calls an appropriate selected function as needed in the ODK subsystem 392 using these callback function pointers. At step 475, the ODK subsystem 392 executes the requested function specified by the application 394 and may convert the generic request as necessary for the target PLC type and performs the requested task in the PLC 390 (e.g., sends a request to PLC 390) or retrieve the desired information from the PLC 390. At step 480, the ODK subsystem 392 receives a response from the PLC 390 for the request sent at step 475, and at step 485, the ODK subsystem 392 may convert the response to a generic response and returns the generic response to the application 394.

At step 490 (not shown in FIG. 6), the process waits until either the PLC 390 transitions from a run state to a stop state or continues processing execute and application requests (i.e., continues with steps 440 or 465 as appropriate). If a transition from a run state to a stop state occurs, then at step 495, the PLC sends a request to the ODK subsystem 392 to deactivate the application 394. At step 500, the ODK subsystem calls a Deactivate function in the application 394 which performs functionality required between the time that the DLL(s) halts normal can cycle execution and the time that the DLL(s) is unloaded or started again. This is similar to an "idle" state for a DLL after it has been executed.

At step 505, if a memory clear and/or a PLC shutdown occurs then at step 510, the ODK subsystem 392 calls the Release function in the application 394 which executes functionality required before the DLL(s) is unloaded. Otherwise, if a memory clear and or PLC shutdown does not occur then continue with step 425. The process may end at 515.

While the invention has been described in terms of embodiments, those skilled in the art will recognize that the invention can be practiced with modifications and in the spirit and scope of the appended claims.

What is claimed is:

1. A method of providing an open development kit (ODK) subsystem, the method comprising the steps of:
    executing a programmable logic controller (PLC) application program in the ODK subsystem, wherein the ODK subsystem having a virtual CPU, the virtual CPU executing the PLC program in a real-time operating environment and executing one or more extensions, the one or more extensions providing access into a scan cycle of the PLC program and replaceable functionality to the operation of the PLC program;
    sending a specific formatted load application request message from the PLC program to the ODK subsystem;
    converting at the ODK subsystem the specific formatted load application request message to a generic formatted load request message;
    sending the generic formatted load request message from the ODK subsystem to an application for requesting the one or more extensions to be loaded by the application; and
    requesting execution of the application, including checking whether there are requests for application execution in the PLC program and, if so, sending a specific formatted execution request from the PLC program to the ODK subsystem, converting the specific formatted execution request to a generic execution request, and sending the generic execution request from the ODK subsystem to the application, the application comprising an Application Wizard, the Application Wizard providing a first mode and a second mode;
    checking whether any requests for information are waiting in the application and, if so, requesting information from the PLC program by the application;
    executing a function in the ODK subsystem specified by the application;
    performing a task in the PLC program associated with the executed function in the ODK subsystem;
    returning a specific formatted response from the PLC program to the ODK subsystem, the ODK subsystem converting the specific formatted response to a generic response; and
    returning the generic response from the ODK subsystem to the application, the ODK subsystem comprising an ODK Real-Time (RTX) Proxy Dynamic Link Library (DLL) usable in the deterministic environment, the ODK RTX Proxy DLL communicating through shared memory with an ODK System Block (SB) Add-on DLL in the non-deterministic environment, wherein, in the first mode, the Application Wizard generates a Real Time Dynamic Link Library project that is usable in a deterministic environment with fixed scan cycles, and in the second mode, the Application Wizard generates a Dynamic Link Library project that is usable in a non-deterministic environment with non-fixed scan cycles, and
    the deterministic environment is a WinAC RTX environment.

2. The method of claim 1, further comprising the steps of:
    initializing callback function pointers for use by the application as callback functions into the ODK subsystem; and
    initializing the one or more extensions after the one or more extensions is loaded.

3. The method of claim 1, wherein the one or more extensions is a dynamic link library (DLL).

4. The method of claim 1, further comprising the step of checking whether a stop to run transition has occurred in the PLC program and if so, sending a specific formatted activate application message from the PLC program to the ODK subsystem.

5. The method of claim 4, further comprising the step of calling an activate function in the application by the ODK subsystem thereby permitting scan cycle execution, the Real Time Dynamic Link Library project comprising a helper class accessing data formats of Step 7 type data from a buffer that is passed between a central processing unit and the application.

6. The method of claim 1, further comprising the step of executing the generic execution request by the application.

7. The method of claim 1, further comprising the steps of:
    sending a generic response from the application to the ODK subsystem;
    converting the generic response to a specific formatted response; and sending the specific formatted response from the ODK subsystem to the PLC program.

8. The method of claim 7, further comprising the step of returning at least one of data and a control block from the application to the ODK subsystem, and from the ODK subsystem to the PLC program.

9. The method of claim 1, wherein in the requesting information from the PLC program the application uses a call back pointer to generically request information and the executing the function step executes the function in the ODK subsystem corresponding to the callback pointer.

10. The method of claim 9, in the executing the function step, the function is provided by a dynamic link library.

11. The method of claim 1, wherein when the checking whether any requests for information are waiting in the application determines that there are no requests for information waiting, the method further comprising:
    waiting until the PLC program transitions from a run state to a stop state;
    sending a deactivate request from the PLC program to the ODK subsystem; and
    calling a deactivate function in the application.

12. The method of claim 11, wherein when a memory clear or PLC program shutdown occurs, the step of calling a release function in the application and unloading the one or more extensions occurs.

13. The method of claim 1, wherein the sending the load application request message from the PLC program is sent from at least one of a soft PLC, a slot PLC and a hard PLC.

14. A system for open development that comprises a computer-readable storage medium encoded with a computer program, the system further comprising:
    a processor;
    one or more extensions providing real-time services in a real-time operating environment; and a virtual CPU executing a programmable logic controller (PLC) application program in the real-time operating environment and further executing the steps of:

receiving a specific formatted load application request message from the PLC program, convert the specific formatted load application request message to a generic formatted load request message, send the generic formatted load request message to an application for requesting the one or more extensions to be loaded by the application; and checking whether there are requests for application execution in the PLC program and, if so, receive a specific formatted execution request from the PLC program, convert the specific formatted execution request to a generic execution request, send the generic execution request to an application, and execute the one or more extensions, wherein the application comprising an Application Wizard, the Application Wizard providing a first mode and a second mode, and checking whether any requests for information are waiting in the application and, if so, request information from the PLC program, execute a function specified by the application, initiate performance of a task in the PLC program associated with the executed function, receive a specific formatted response from the PLC program, convert the specific formatted response to a generic response, and return the generic response to the application using a Real Time (RTX) Proxy Dynamic Link Library (DLL), the RTX Proxy DLL usable in the deterministic environment and communicating through shared memory with a System Block (SB) Add-on DLL in the non-deterministic environment, wherein, in the first mode, the Application Wizard generates a Real Time Dynamic Link Library project that is usable in a deterministic environment with fixed scan cycles, and in the second mode, the Application Wizard generates a Dynamic Link Library project that is usable in a non-deterministic environment with non-fixed scan cycles, and wherein the one or more extensions provide access into the scan cycle of the PLC program and to provide replaceable functionality to the operation of the PLC program, and the deterministic environment is a WinAC RTX environment.

15. The system of claim 14, further comprising:

a system block loader loading system blocks, the system blocks including at least one of a system function block, a system function, a system data block; and an Open Development Kit (ODK) SB Add-on dynamic link library (DLL) for implementing a common object module (COM) interface for the virtual CPU and system block loader.

16. The system of claim 14, wherein the one or more extensions are dynamic link libraries.

17. A system comprising a computer-readable storage medium encoded with a computer program, the computer program providing an open development kit (ODK) subsystem, the system further comprising:

means for executing a programmable logic controller (PLC) application program in the ODK subsystem, the ODK subsystem having a virtual CPU executing the PLC program in a real-time operating environment and executing one or more extensions, the one or more extensions providing access into the scan cycle of the PLC program and replaceable functionality to the operation of the PLC program;

means for sending a specific format load application request message from the PLC program to the ODK subsystem;

means for converting the specific format load application request to a generic format load request message by the ODK subsystem;

means for sending the generic format load request message from the ODK subsystem to an application requesting the one or more extensions to be loaded by the application;

means for requesting execution of the application, including a means for checking whether there are requests for application execution in the PLC program and, if so, a means for sending a specific formatted execution request from the PLC program to the ODK subsystem, a means for converting the specific formatted execution request to a generic execution request, and a means for sending the generic execution request from the ODK subsystem to the application, the application comprising an Application Wizard, the Application Wizard providing a first mode and a second mode;

means for determining whether any requests for information are waiting in the application and, if so, requesting information from the PLC program by the application;

means for executing a function in the ODK subsystem specified by the application;

means for performing a task in the PLC program associated with the executed function in the ODK subsystem;

means for returning a specific formatted response from the PLC program to the ODK subsystem, the ODK subsystem converting the specific formatted response to a generic response; and means for returning the generic response from the ODK subsystem to the application, the ODK subsystem comprising an ODK Real-Time (RTX) Proxy Dynamic Link Library (DLL) usable in the deterministic environment, the ODK RTX Proxy DLL communicating through shared memory with an ODK System Block (SB) Add-on DLL in the non-deterministic environment, wherein, in the first mode, the Application Wizard generates a Real Time dynamic Link Library project that is usable in a deterministic environment with fixed scan cycles, and in the second mode, the Application Wizard generates a Dynamic Link Library project that is usable in a non-deterministic environment with non-fixed scan cycles, and the deterministic environment is a WinAC RTX environment.

18. The system of claim 17, further comprising:

means for initializing callback function pointers for use by the application as callback functions into the ODK subsystem; and means for initializing the one or more extensions after the one or more extensions is loaded.

19. The system of claim 17, further comprising means for checking whether a stop to run transition has occurred in the PLC program and if so, means for sending a specific activate application message from the PLC program to the ODK subsystem.

20. The system of claim 19, further comprising means for calling an activate function in the application by the ODK subsystem thereby permitting scan cycle execution.

21. The system of claim 17, further comprising means for executing the generic formatted execution request by the application.

22. The system of claim 21, further comprising:
means for sending a generic response from the application to the ODK subsystem;
means for converting the generic response to a specific formatted response; and
means for sending the specific formatted response from the ODK subsystem to the PLC program.

23. The system of claim 22, further including means for returning at least one of data and a control block from the application to the ODK subsystem, and from the ODK subsystem to the PLC program.

24. The system of claim 17, wherein the means for requesting information by the application uses a call back pointer to request information and the means for executing the function in the ODK subsystem executes the function in the ODK subsystem corresponding to the callback pointer.

25. The system of claim 24, wherein the function is provided by a dynamic link library (DLL).

26. The system of claim 17, wherein the PLC program is at least one of a soft PLC, a hard PLC, and a slot PLC.

27. A computer program product comprising a computer storage medium having readable program code embodied in the medium, the computer program product further comprising a kit for open development (ODK) subsystem, the ODK subsystem comprising:
means for executing a programmable logic controller (PLC) application program in a real-time operating environment executing one or more extensions in a virtual CPU, the one or more extensions providing access into the scan cycle of the PLC program and replaceable functionality to the operation of the PLC program;
means for receiving a specific formatted load application request message from the PLC program;
means for converting the specific formatted load application request message to a generic formatted load request message;
means for sending the generic formatted load request message to an application for requesting the one or more extensions to be loaded by the application;
means for determining whether there are requests for application execution in the PLC program,
means for receiving a specific formatted message from the PLC program in response to determining requests for application execution are in the PLC program, wherein the specific formatted message is a request for application execution;
means for converting the specific formatted message to a generic formatted message;
means for sending the generic formatted message to an application for execution, the application comprising an Application Wizard, the Application Wizard providing a first mode and a second mode;
means for checking whether any requests for information are waiting in the application;
means for requesting information from the PLC program by the application in response to determine requests for information are waiting in the application;
means for executing a function in the ODK subsystem specified by the application;
means for performing a task in the PLC program associated with the executed function in the ODK subsystem;
means for returning a specific formatted response from the PLC program to the ODK subsystem, the ODK subsystem converting the specific formatted response to a generic response; and
means for returning the generic response from the ODK subsystem to the application, the ODK subsystem comprising an ODK Real-Time (RTX) Proxy Dynamic Link Library (DLL) usable in the deterministic environment, the ODK RTX Proxy DLL communicating through shared memory with an ODK System Block (SB) Add-on DLL in the non-deterministic environment, wherein, in the first mode, the Application Wizard generates a Real Time dynamic Link Library project that is usable in a deterministic environment with fixed scan cycles, and in the second mode, the Application Wizard generates a Dynamic Link Library project that is usable in a non-deterministic environment with non-fixed scan cycles, and
the deterministic environment is a WinAC RTX environment.

28. The computer program product of claim 27, wherein the ODK subsystem further comprising:
means for receiving the generic formatted message from the application;
means for converting the generic formatted message to the specific formatted message; and
means for sending the specific formatted message to the PLC program.

29. The computer program product of claim 28, wherein at least one of the means includes using a dynamic link library that loads replaceable functionality.

30. The computer program product of claim 28, wherein the generic formatted message is one of a response message and a request for information message.

31. The computer program product of claim 28, wherein the specific formatted message is sent to at least one of a soft PLC, a hard PLC and a slot PLC.

32. A computer program product comprising a computer storage medium having readable program code embodied in the medium, the computer program product comprising:
a first computer program code to send a specific formatted load application request message from a programmable logic controller (PLC) to an open development kit (ODK) subsystem;
a second computer program code to convert the specific formatted load application request message to a generic formatted load application request message;
a third computer program code to send the generic formatted load request message from the ODK subsystem to an application for requesting an extension to be loaded by the application; and
a fourth computer program code to request execution of the application, check whether there are requests for application execution in the PLC and, if so, send a specific formatted execution request from the PLC to the ODK subsystem, convert the specific formatted execution request to a generic execution request, and send the generic execution request from the ODK subsystem to the application, the application comprising an Application Wizard, the Application Wizard providing a first mode and a second mode;
a fifth computer program code to check whether any requests for information are waiting in the application and, if so, request information from the PLC by the application, execute a function in the ODK subsystem specified by the application, and perform a task in the PLC associated with the executed function in the ODK subsystem;
a sixth computer program code to return a specific formatted response from the PLC to the ODK subsystem, the ODK subsystem converting the specific formatted response to a generic response, and return the generic response from the ODK subsystem to the application, the ODK subsystem comprising an ODK Real-Time RTX Proxy Dynamic Link Library DLL usable in the deterministic environment, the ODK RTX Proxy DLL communicating through shared memory with an ODK System Block (SB) Add-on DLL in the non-deterministic environment; and an seventh computer program code to provide a virtual CPU executing a programmable logic controller (PLC) application program in the real-time operating environment and executing the one or more extensions, the one or more extensions providing access into the scan cycle of the PLC and replaceable functionality to the operation of the PLC;

wherein, in the first mode, the Application Wizard generates a Real Time dynamic Link Library project that is usable in a deterministic environment with fixed scan cycles, and in the second mode, the Application Wizard generates a Dynamic Link Library project that is usable in a non-deterministic environment with non-fixed scan cycles, and the deterministic environment is a WinAC RTX environment.

* * * * *